(12) United States Patent
Huston

(10) Patent No.: US 7,520,357 B1
(45) Date of Patent: Apr. 21, 2009

(54) METHOD OF INSTALLING CRUISE CONTROL FOR A MOTORCYCLE

(75) Inventor: Fred M. Huston, Simi Valley, CA (US)

(73) Assignee: 50'S Boy, LLC, Simi Valley, CA (US)

( * ) Notice: Subject to any disclaimer, the term of this patent is extended or adjusted under 35 U.S.C. 154(b) by 237 days.

(21) Appl. No.: 11/282,225

(22) Filed: Nov. 17, 2005

(51) Int. Cl.
*B60K 31/00* (2006.01)

(52) U.S. Cl. .......................... 180/170; 180/315; 74/488

(58) Field of Classification Search ................. 180/170, 180/315; 74/488
See application file for complete search history.

(56) References Cited

U.S. PATENT DOCUMENTS

| | | | |
|---|---|---|---|
| 3,982,446 A | 9/1976 | Van Dyken | |
| 4,256,197 A | 3/1981 | Kiser, Jr. | |
| 4,364,283 A * | 12/1982 | Ricardo | 74/489 |
| 4,848,502 A | 7/1989 | Kikuta et al. | |
| 6,111,209 A | 8/2000 | Dzurnak | |
| 6,318,490 B1 | 11/2001 | Laning | |
| 6,820,710 B2 | 11/2004 | Fechner | |
| 2003/0047372 A1 * | 3/2003 | Fechner | 180/335 |

* cited by examiner

*Primary Examiner*—Christopher P Ellis
*Assistant Examiner*—Katy Meyer
(74) *Attorney, Agent, or Firm*—Greenberg Traurig

(57) ABSTRACT

Described is a method of installing a cruise control on a motorcycle. A throttle member of the motorcycle is initially maintained with an installation fixture. The installation fixture may be a cube having six different sized bores to accommodate different sized throttle members. The cruise control is situated to encircle the throttle member and affixed with attachment means (e.g., screws). The throttle member is then attached or reattached to the handlebar thereby allowing the cruise control to control the motorcycle's speed.

24 Claims, 6 Drawing Sheets

METHOD OF INSTALLING CRUISE CONTROL FOR A MOTORCYCLE

FIELD OF THE INVENTION

The embodiments of the present invention relate to a cruise control for a motorcycle, and more particularly to a method of installing a cruise control on the motorcycle.

BACKGROUND

Automobiles frequently employ cruise controls that enable a driver to select the speed of the automobile and maintain the set speed without depressing the foot pedal or throttle of the automobile. Likewise, attempts have been made to provide cruise controls for motorcycles. Many of the conventional motorcycle cruise controls that are currently available in the marketplace are either inconvenient to use or, in many instances, are unsafe or unreliable. Furthermore, methods of installing the same cruise controls have also proven to be difficult and challenging.

Therefore, there exists a need for a reliable motorcycle cruise control and method of installing the cruise control on the motorcycle wherein the method is not only simple, quick and safe, but also cost efficient such that a rider can conveniently perform the installation in his or her own garage at home.

SUMMARY

Accordingly, one embodiment of the present invention is a method of installing a cruise control on a motorcycle having a throttle member for controlling the motorcycle's speed attached to a handlebar of the motorcycle, the method comprising maintaining the throttle member with an installation fixture; situating the cruise control such that the cruise control substantially encircles a section of the throttle member; affixing the cruise control to the throttle member with attachment means; and attaching the throttle member with the affixed cruise control to the handlebar of the motorcycle.

In other embodiments, a stabilizing element can also be attached to minimize rotation of a cruise control housing. In an after market embodiment, throttle cables may also need to be loosened or detached prior to removing the throttle member from the handlebar, and may also need to be retightened or reconnected after reattaching the throttle member and the affixed cruise control to the handlebar.

Other variations, embodiments, and features of the present invention will become evident from the following detailed description, drawings and claims.

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

Figure 1:
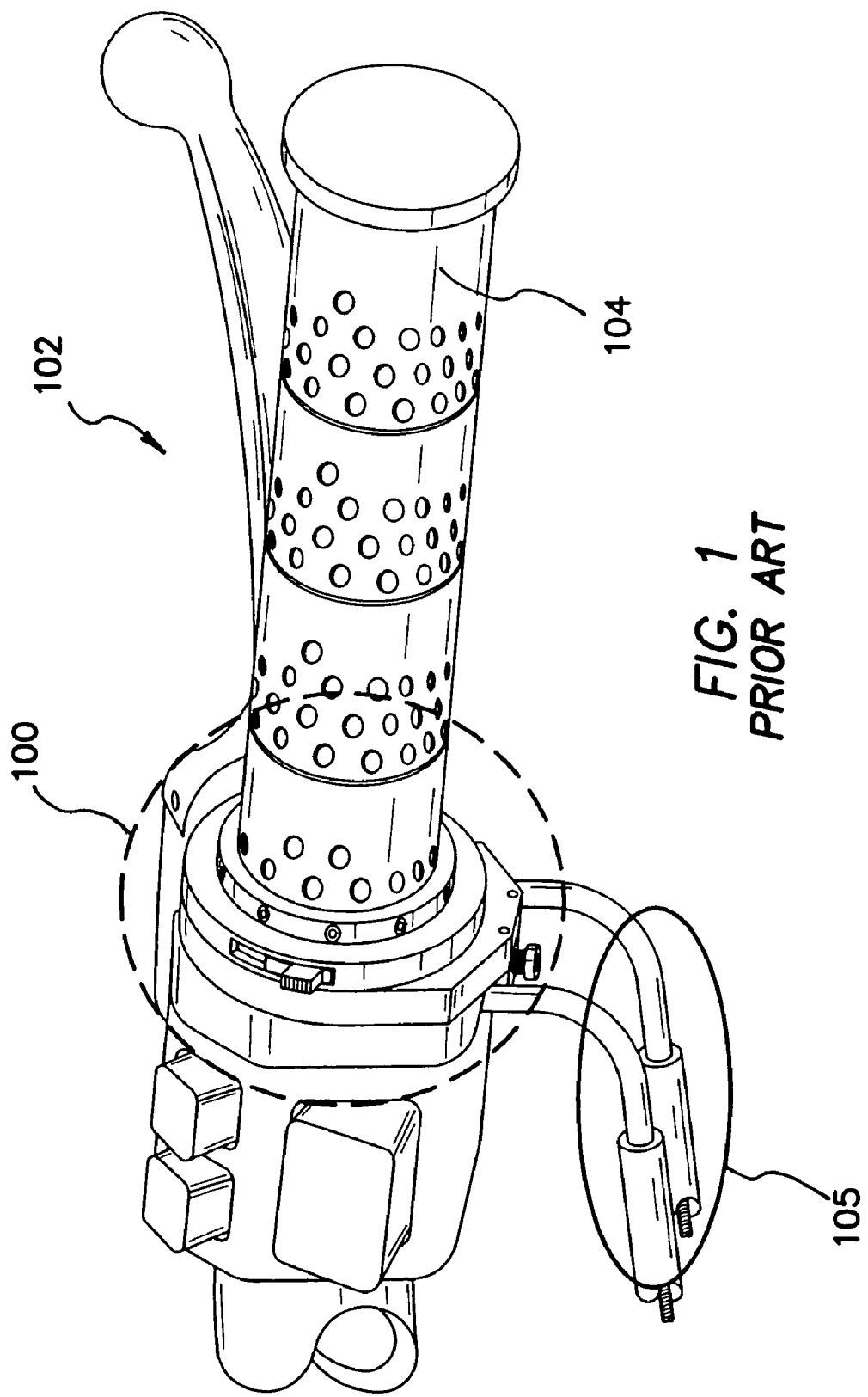
FIG. 1 illustrates a perspective view of a cruise control mounted on a motorcycle's handlebar.

Initial reference is made to FIG. 1, which illustrates a cruise control 100 described in a commonly owned U.S. Pat. No. 6,250,173 entitled "Cruise Control for a Motorcycle," Ser. No. 09/217,146, filed Dec. 21, 1998, which is incorporated herein by reference in its entirety for all purposes. It is noted that the cruise control 100 may be installed during production of the motorcycle or may be an after market product that owners or dealers may install. As illustrated in FIG. 1, the cruise control 100 fits over a handlebar 102 of a motorcycle (not shown). The handlebar 102 may or may not support a grip 104. The grip 104 can be leather or textured to provide for extra friction and/or comfort in handling the motorcycle. The grip 104 covers a throttle member (not shown), which connects with the fuel feeding system (not shown) of the motorcycle through push/pull throttle cables 105. Additional details of the relationship between the grip 104 and the throttle member are provided below.

Figure 2:
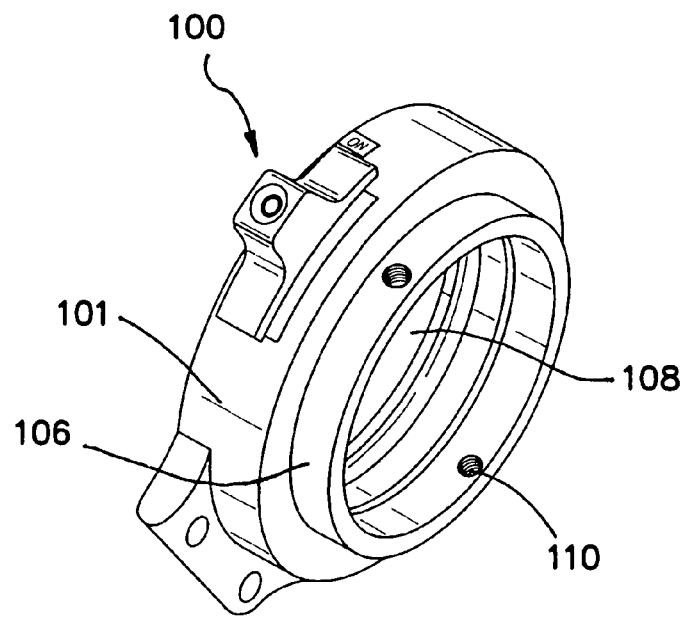
FIG. 2 illustrates a perspective view of the cruise control of FIG. 1.

FIG. 2 illustrates a perspective view of the cruise control 100 showing some of the major components. All components of the cruise control 100 are depicted in the drawings of U.S. Pat. No. 6,250,173. As shown, the cruise control 100 includes a detent ring 106 with multiple holes 110 and a central opening 108. The cruise control 100 fits over the throttle member via the central opening 108 whereby screws (not shown) are inserted through the plurality of holes 110 thereby securing the cruise control 100 in a fixed position relative to the throttle member. In one embodiment, the detent ring 106 of the cruise control 100 has four holes 110.

Figure 3:
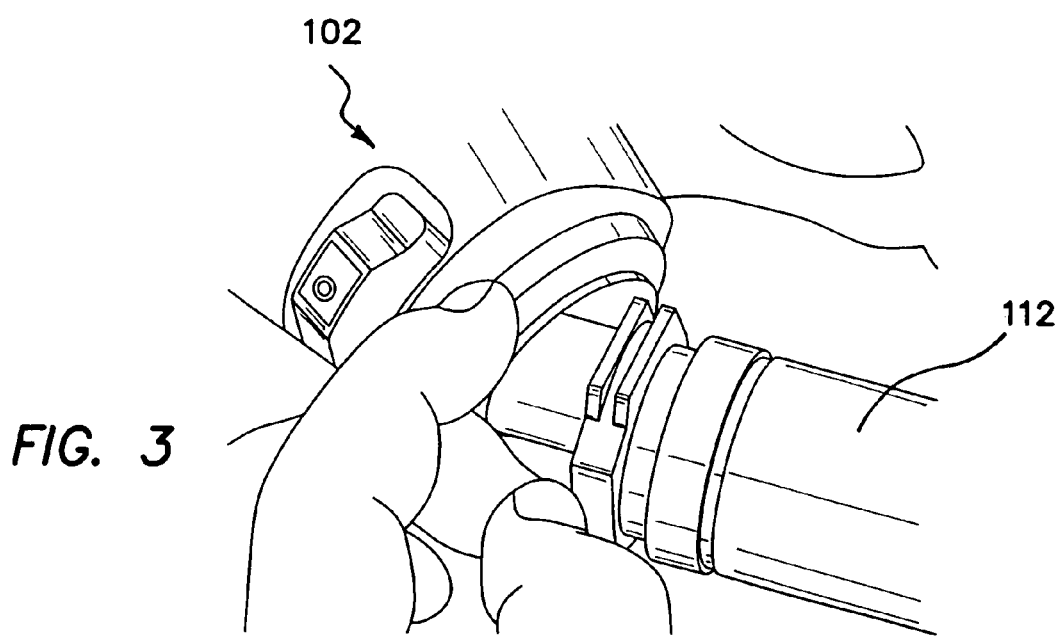
FIG. 3 illustrates a perspective view of a throttle member being removed from a motorcycle's handlebar.

FIG. 3 illustrates throttle member 112 being removed from the handlebar 102 of the motorcycle. In accordance with conventional practice, the handlebar 102 of the motorcycle includes a throttle member 112, which may or may not have a grip 104 covering its exterior surface (the figure as illustrated shows the grip 104 already removed from the handlebar 102). The throttle member 112 connects with the fuel feeding system of the motorcycle through push/pull throttle cables 105. While removing either the grip 104 or the throttle member 112, screws or wires, including the push/pull throttle cables 105, connected to the throttle member 112 may also need to be loosened or removed. In some cases, the cruise control can be installed during motorcycle production such that the throttle member 112 is initially attached to the motorcycle with the cruise control 100 in place.

Figure 4:
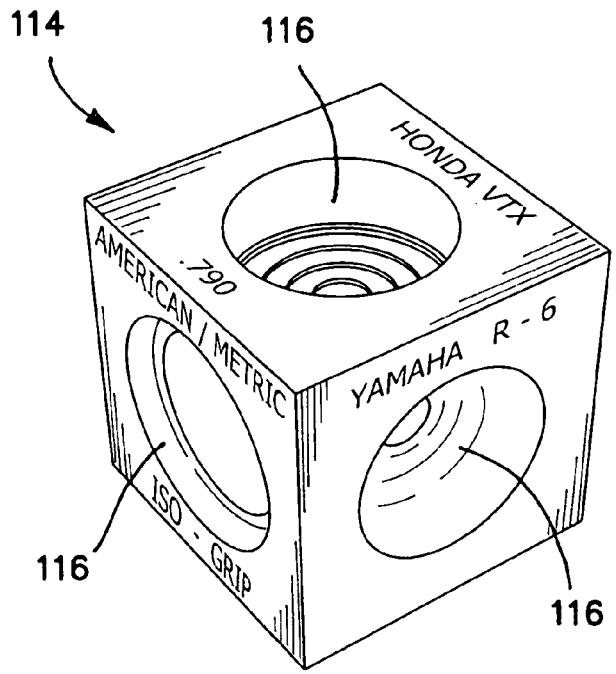
FIG. 4 illustrates a perspective view of an installation fixture.

FIG. 4 illustrates an installation fixture 114 for maintaining the throttle member 112 while the cruise control 100 is being installed thereon. As shown, the installation fixture 114 is a metallic cube with bores or enlarged holes 116 on all six sides thereof. Alternatively, the installation fixture 114 need not be a cube such that it may have as many or as few bores as needed. Also, instead of using an installation fixture 114 in the form of a cube or other polygonal shapes, the installation fixture 114 can be a disc (not shown) with a single bore 116. In such an embodiment, multiple discs accommodate different sized throttle members. As shown in FIG. 4, the bores 116 are enlarged holes of a specific dimension based on pre-measured data, and can be machined by lathes, jig borers, milling machines, or other known methods. For example, throttle members 112 from different motorcycle manufacturers such as Harley-Davidson, Yamaha, and Honda may be removed and measured. The measurements are then used to determine how deep and how wide to drill in order to properly form the bores 116 corresponding to each manufacturer's throttle member.

Figure 5:
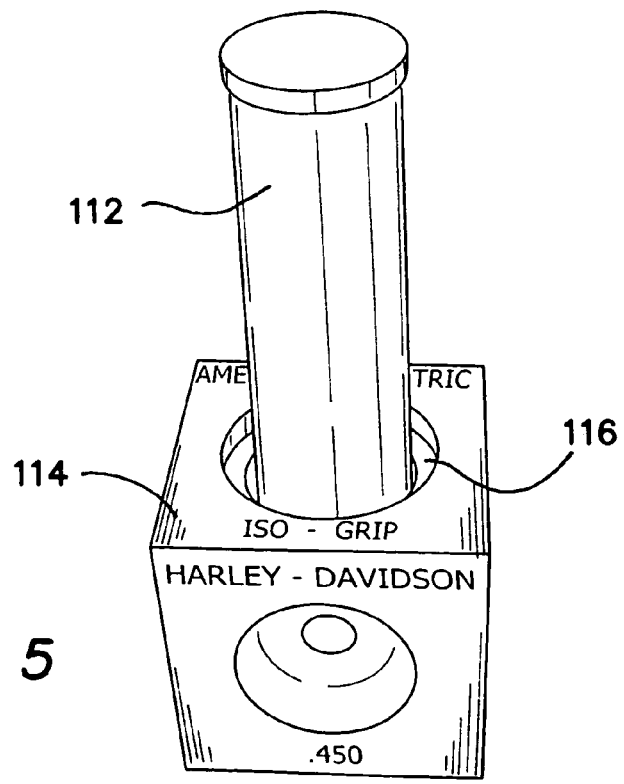
FIG. 5 illustrates a perspective view of the throttle member being maintained by a bore in the installation fixture of FIG. 4.
Figure 6:
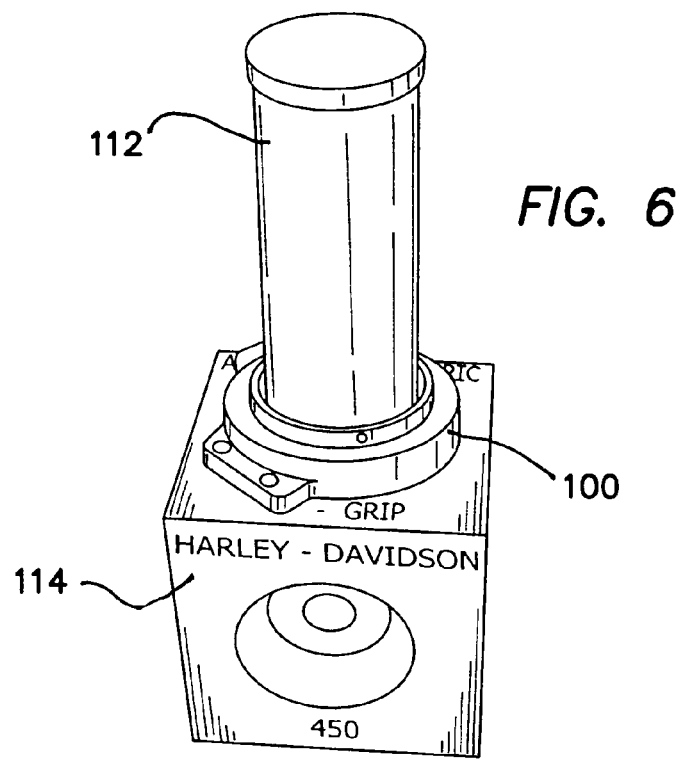
FIG. 6 illustrates a perspective view of the cruise control being slipped onto the throttle member of FIG. 5.

FIG. 5 illustrates the removed throttle member 112 being maintained by the installation fixture 114. Since the bores 116 are machined based on the dimensions of different manufacturer's throttle members, one of the bores 116 of the installation fixture 114 properly accommodates the throttle member 112. The cruise control 100 is subsequently slipped over the throttle member 112 until it rests against a surface of the cube side having the proper bore 116 as illustrated in FIG. 6. Alternatively, the cruise control 100 may first be placed on the cube surface having the proper bore 106 so that the throttle member 112 may be inserted through opening 108 in the cruise control 100 and then into the bore 106.

Figure 7:
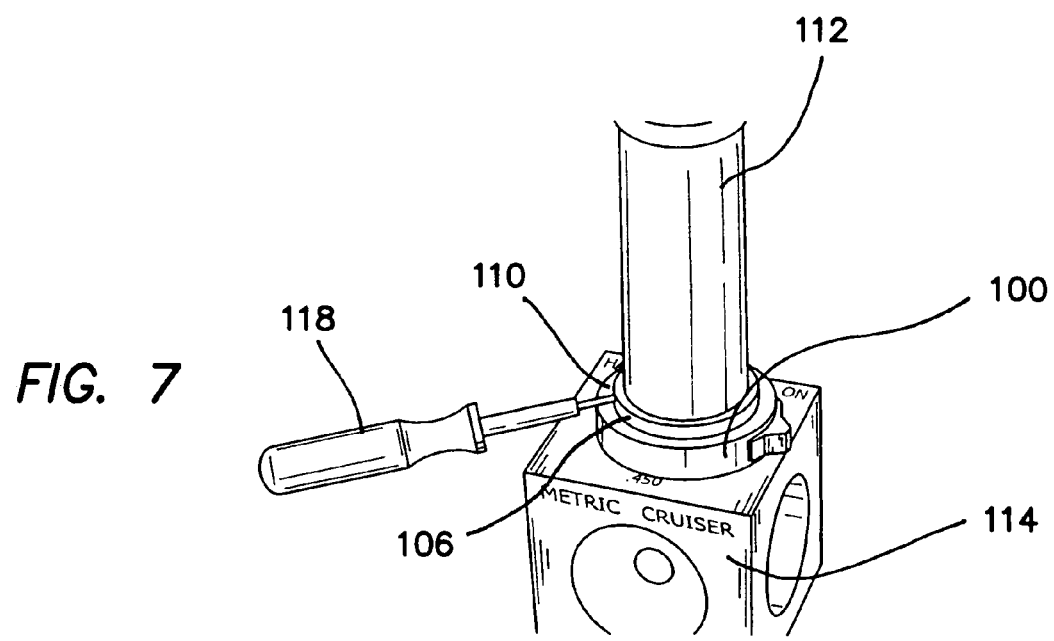
FIG. 7 illustrates a perspective view of maintaining and centering the throttle member of FIG. 6.

FIG. 7 illustrates maintaining and centering, with attachment means, the throttle member 112 relative to the cruise control 100. In one embodiment, the attachment means comprises four screws (not shown) which are suitable for being inserted through the holes 110 of the detent ring 106. Other attachment means includes rivets, adhesives and similar items and materials. Initially, the screws are inserted through holes 110 to make contact with the throttle member 112 so the screws can be adjusted with a screwdriver 118 as necessary to maintain and center the throttle member 112 with respect to the cruise control opening 108. In other words, based on acceptable tolerances, the throttle member 112 is likely able to slightly shift position within the cruise control opening 108 such that it should be centered within the cruise control opening 108 prior to attachment of the cruise control 100. However, with accurate tolerances, it will not be necessary to center the throttle member 112 within the opening 108. A suitable screw for attaching the cruise control 100 is a 440 screw.

Figure 8:
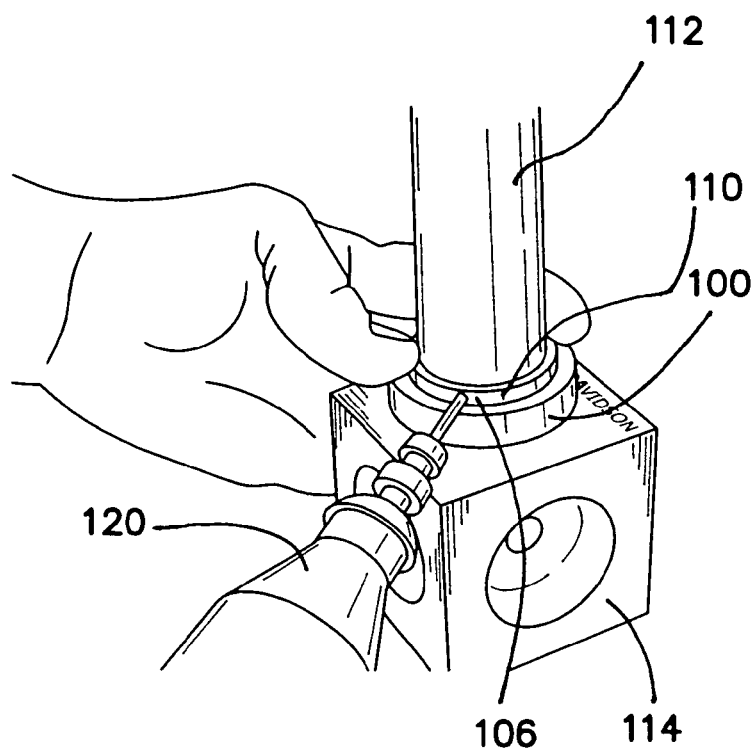
FIG. 8 illustrates a perspective view of securing and affixing the throttle member of FIG. 7.

FIG. 8 illustrates securing and affixing the screws to the throttle member 112. Once the throttle member 112 has been centered by manipulating the screws in the holes 110 of the detent ring 106, they can be securely affixed to the throttle member 112. One method is to remove one of the screws from its corresponding hole 110 and use a drill 120 to drill a hole (not shown), in alignment with the corresponding hole 110, through the throttle member 112 as shown in FIG. 8. After drilling the necessary hole in the throttle member 112, the screw that was previously removed is repositioned and screwed into the newly drilled hole of the throttle member 112. Prior to completely tightening the screw, some sealants or adhesives, such as Loc-tite, epoxy, or glue, may be applied to a portion of these screw for a better and more secure fit. The process is then repeated for each other screw individually. In this instance, the process is repeated three more times since the detent ring 106 has four holes 110 with four screws. After securing the other screws, the throttle member 112 with the newly affixed cruise control 100, is removed from the installation cube 114. If necessary, the inner surface of the throttle member 112 is de-burred to remove any sharp edges or roughness as a result of the drilling process.

Figure 9:
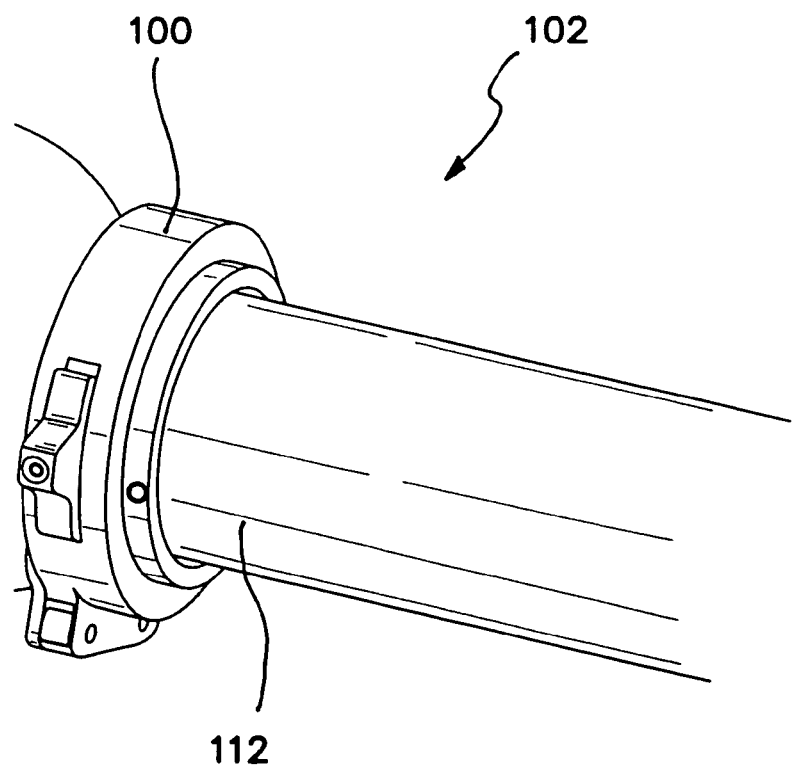
FIG. 9 illustrates a perspective view of the cruise control mounted on a motorcycle's handlebar.

FIG. 9 illustrates the throttle member 112 with the affixed cruise control 100 being repositioned and reattached to the handlebar 102 of the motorcycle. Any cables or wires that were removed, including the push/pull throttle cables 105 of the throttle wire fuel feeding system, may need to be retightened and reconnected. After reattaching and readjusting the throttle cables 105, the rotational movement of the throttle member 112 should also be checked. The grip 104 covering the exterior surface of the throttle member 112 can subsequently be reattached (the figure does not show the grip 104 being reattached but it would look similar to the throttle member 112 being reattached to the handlebar 102 of the motorcycle), if there is a grip 104 covering the throttle member 112.

Figure 10:
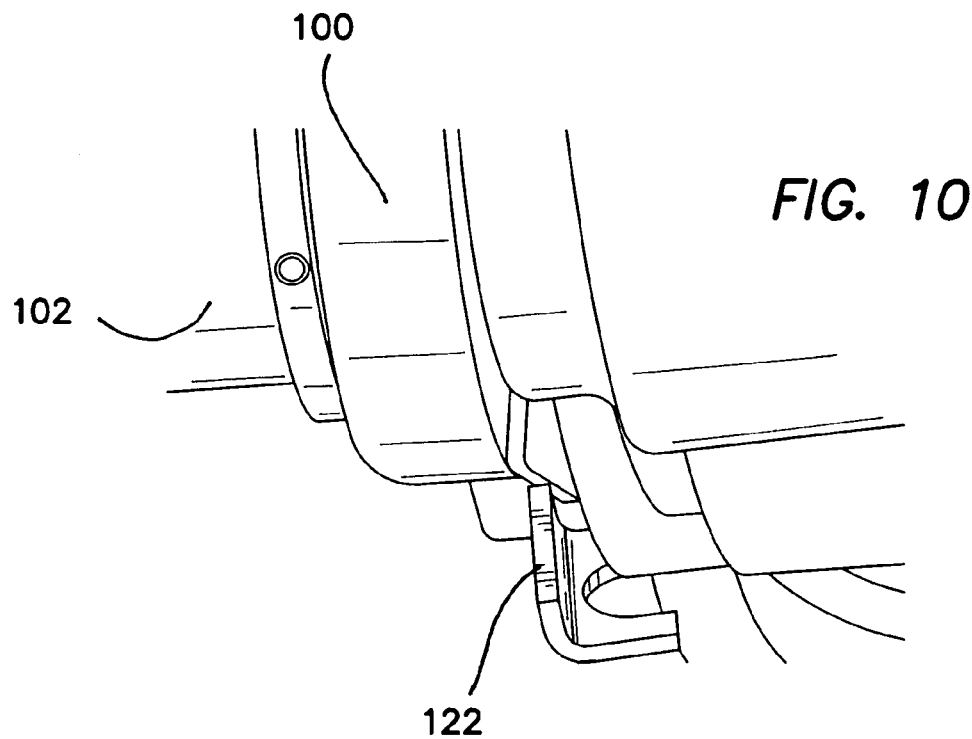
FIG. 10 illustrates a perspective view of a stabilizing member being mounted to the motorcycle's handlebar of FIG. 9.

FIG. 10 illustrates the addition of a stabilizing member 122 to the handlebar 102 of the motorcycle. The stabilizing member 122 is a metal or plastic piece that is installed on the handlebar 102 between the throttle member 112 and the cruise control 100 in order to prevent the housing 101 of the newly installed throttle member 112 from rotating relative to the throttle member 112. In other words, the design of the cruise control 100 is such that the housing 101 may, under some circumstances (e.g., when not activated), freely rotate in relation to the detent ring 106, which is fixed to the throttle member 112 by the screws.

Figure 11:
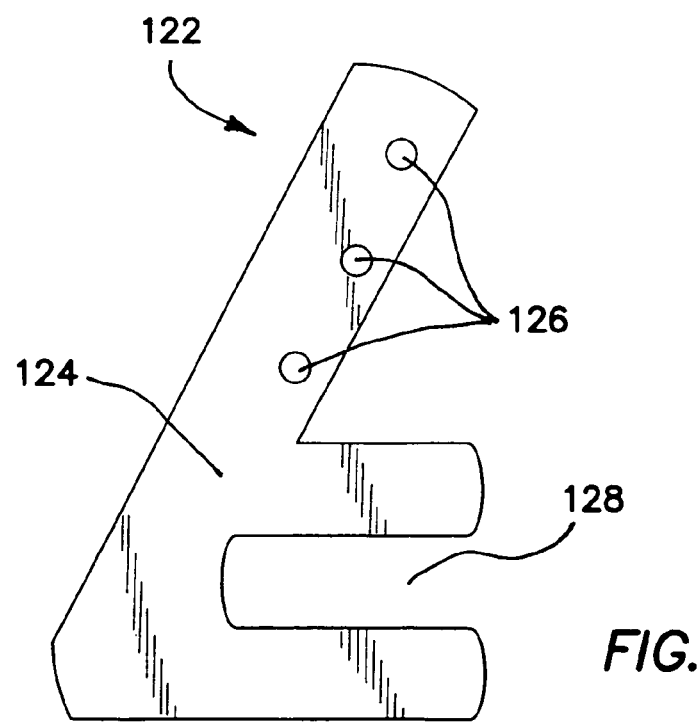
FIG. 11 illustrates a perspective view of the stabilizing member of FIG. 10.

FIG. 11 illustrates a perspective view of the stabilizing member 122 of FIG. 10. The body 124 of the stabilizing member 122 is straight and sits beneath the handlebar 102 as illustrated in FIG. 10. However, the body 124 of the stabilizing member 122 can take on any shape or form as necessary in order to situate inconspicuously beneath the handlebar 102 of the motorcycle and to accommodate various motorcycle designs. The stabilizing member 122 also includes holes 126 whereby additional screws (not shown) can be used to fasten the stabilizing member 122. In one instance, the stabilizing member 122 can be fastened to the throttle member 112. Alternatively, the stabilizing member 122 can be fastened to the cruise control 100. After the stabilizing member 122 has been installed, one or more of the throttle push/pull cables 105 for controlling the wire fuel feeding system are fed through the fork 128 thereby preventing the housing 101 of the cruise control 100 from rotating relative to the throttle member 112.

Although the invention has been described in detail with reference to several embodiments, additional variations and modifications exist within the scope and spirit of the invention as described and defined in the following claims.

I claim:

1. A method of installing a cruise control on a motorcycle having a throttle member for controlling the motorcycle's speed attached to a handlebar of the motorcycle, the method comprising:
    maintaining the throttle member with an installation fixture, said throttle member separate from said motorcycle;
    situating the cruise control such that the cruise control substantially encircles a section of the throttle member;
    affixing the cruise control to the throttle member with attachment means; and
    attaching the throttle member with the affixed cruise control to the handlebar of the motorcycle.

2. The method of claim 1, further comprising first removing the throttle member from the motorcycle.

3. The method of claim 2, further comprising loosening or detaching throttle cables from the throttle member when removing the throttle member from the handlebar of the motorcycle.

4. The method of claim 1, further comprising tightening or connecting throttle cables to the throttle member when attaching the throttle member with the affixed cruise control to the handlebar of the motorcycle.

5. The method of claim 1, further comprising utilizing an installation fixture in the form of a metallic cube having one or more bores based on pre-measured data from different sized throttle members.

6. The method of claim 1, further comprising affixing the cruise control to the throttle member with attachment means in the form of screws.

7. The method of claim 6, further comprising using sealants or adhesives in combination with the screws to affix the cruise control to the throttle member.

8. The method of claim 1, further comprising centering the throttle member within an opening in the cruise control.

9. The method of claim 1, further comprising deburring the throttle member prior to attaching the throttle member with the affixed cruise control to the handlebar of the motorcycle.

10. The method of claim 1, further comprising attaching a stabilizing member to minimize rotation.

11. A method of installing a cruise control for a motorcycle having a throttle member for controlling the motorcycle's speed attached to a handlebar of the motorcycle, the method comprising:
   removing the throttle member from the motorcycle;
   maintaining the throttle member with an installation fixture;
   situating the cruise control such that the cruise control substantially encircles a section of the throttle member;
   affixing the cruise control to the throttle member with attachment means;
   attaching the throttle member with the affixed cruise control to the handlebar of the motorcycle; and
   attaching a stabilizing member between the throttle member and the cruise control to minimize rotation.

12. The method of claim 11, further comprising loosening or detaching throttle cables from the throttle member when removing the throttle member from the motorcycle.

13. The method of claim 11, further comprising retightening or reconnecting throttle cables to the throttle member when reattaching the throttle member with the affixed cruise control to the handlebar of the motorcycle.

14. The method of claim 11 further comprising utilizing an installation fixture in the form of a metallic cube having one or more bores based on pre-measured data from different sized throttle members.

15. The method of claim 11, further comprising affixing the cruise control to the throttle member with attachment means in the form of screws.

16. The method of claim 15, further comprising using sealants or adhesives in combination with the screws to affix the cruise control to the throttle member.

17. The method of claim 11, further comprising centering the throttle member within an opening in the cruise control.

18. The method of claim 11, further comprising deburring the throttle member prior to reattaching the throttle member with the affixed cruise control to the handlebar of the motorcycle.

19. A method of installing a cruise control for a motorcycle having a throttle member for controlling the motorcycle's speed attached to a handlebar of the motorcycle, the method comprising:
   removing the throttle member from the motorcycle;
   maintaining the throttle member with an installation fixture;
   situating the cruise control such that the cruise control substantially encircles a section of the throttle member;
   affixing the cruise control to the throttle member with attachment means; and
   reattaching the throttle member with the affixed cruise control to the handlebar of the motorcycle.

20. The method of claim 19, further comprising loosening or detaching throttle cables from the throttle member when removing the throttle member from the motorcycle.

21. The method of claim 19, further comprising retightening or reconnecting throttle cables to the throttle member when reattaching the throttle member with the affixed cruise control to the handlebar of the motorcycle.

22. The method of claim 19, further comprising affixing the cruise control to the throttle member with installation fixture in the form of a metallic cube having one or more bores based on pre-measured data from different sized throttle members.

23. The method of claim 19, further comprising centering the throttle member within an opening in the cruise control.

24. The method of claim 19, further comprising attaching a stabilizing member to minimize rotation.

* * * * *